(12) United States Patent
Wyatt

(10) Patent No.: US 12,331,252 B2
(45) Date of Patent: Jun. 17, 2025

(54) METHOD OF DESULFURIZING AN OIL COMPOSITION

(71) Applicant: CURVE ENERGY PTE. LTD., High Street Centre (SG)

(72) Inventor: Mathew Selwyn Wyatt, Karlovy Vary (CZ)

(73) Assignee: CURVE ENERGY PTE. LTD., High Street Centre (SG)

(*) Notice: Subject to any disclaimer, the term of this patent is extended or adjusted under 35 U.S.C. 154(b) by 238 days.

(21) Appl. No.: 18/018,250

(22) PCT Filed: Jul. 28, 2021

(86) PCT No.: PCT/IB2021/056836
§ 371 (c)(1),
(2) Date: Jan. 26, 2023

(87) PCT Pub. No.: WO2022/023986
PCT Pub. Date: Feb. 3, 2022

(65) Prior Publication Data
US 2023/0287277 A1  Sep. 14, 2023

(30) Foreign Application Priority Data
Jul. 28, 2020 (AU) .................. 2020902648

(51) Int. Cl.
*C10G 21/20* (2006.01)
*C10G 21/16* (2006.01)
(Continued)

(52) U.S. Cl.
CPC ............. *C10G 21/20* (2013.01); *C10G 21/16* (2013.01); *C10G 21/18* (2013.01); *C10G 53/14* (2013.01); *C10G 2300/202* (2013.01)

(58) Field of Classification Search
CPC ........ C10G 21/20; C10G 21/16; C10G 21/18; C10G 53/14; C10G 2300/202;
(Continued)

(56) References Cited

U.S. PATENT DOCUMENTS

2009/0008295 A1  1/2009  Kozyuk
2011/0011768 A1*  1/2011  Keusenkothen ......... C10G 9/26
208/69
(Continued)

FOREIGN PATENT DOCUMENTS

CN  105778991 A  7/2016
CN  105778997 A  7/2016
(Continued)

OTHER PUBLICATIONS

Deep Eutectic Solvents for extraction-desulfurization: a review (Year: 2019).*
(Continued)

*Primary Examiner* — Randy Boyer
*Assistant Examiner* — Juan C Valencia
(74) *Attorney, Agent, or Firm* — Fitch, Even, Tabin & Flannery LLP

(57) ABSTRACT

The invention provides a method of desulfurizing an oil composition, the method comprising: flowing an oil composition comprising sulfur through a conduit comprising a constricted region, wherein oil-phase bubbles form in the constricted region and collapse in a turbulent zone downstream of the constricted region; contacting the oil composition with an immiscible deep eutectic solvent in the turbulent zone, thereby extracting at least a portion of the sulfur from the oil composition into association with the deep eutectic solvent; and separating the deep eutectic solvent and the extracted sulfur from the desulfurized oil composition.

20 Claims, 3 Drawing Sheets

(51) Int. Cl.
*C10G 21/18* (2006.01)
*C10G 53/14* (2006.01)

(58) Field of Classification Search
CPC .. C10G 2300/205; C10G 21/06; C10G 27/12; C10G 32/00; C10G 31/06; C10G 53/04; C10G 21/12; C10G 32/02; B01D 11/0438; B01D 2009/009; B01D 11/0473; B01D 11/0488
See application file for complete search history.

(56) References Cited

U.S. PATENT DOCUMENTS

| | | |
|---|---|---|
| 2016/0024399 A1 | 1/2016 | Gargano et al. |
| 2017/0045255 A1 | 2/2017 | Karamanos et al. |
| 2020/0355541 A1* | 11/2020 | McCurdy ............... B01J 19/002 |

FOREIGN PATENT DOCUMENTS

| | | | |
|---|---|---|---|
| CN | 105802658 A | 7/2016 | |
| CN | 110194965 A | 9/2019 | |
| EP | 2650345 A1 * | 10/2013 | ............. C10G 21/06 |
| WO | 2011008389 A2 | 1/2011 | |
| WO | WO-2014200141 A1 * | 12/2014 | .......... C10M 175/00 |

OTHER PUBLICATIONS

Application No. PCT/IB2021/056836; International Search Report and Written Opinion; mailed Sep. 21, 2021.
Davannendran Chandran et al., "Deep eutectic solvents for extraction-desulphurization: A review", Journal of Molecular Liquids, 275, (2019), pp. 312-322.
Extended European Search Report issued in EP Application No. 21850715.0; Feb. 10, 2025; 10 pages.
Examination Result issued by United Arab Emirates Ministry of Economy in Patent Application No. P6000194/2023; 6 pages.
Skrzypek et al., "The Mixing Hydrodynamics and Efficiency of the Venturi Jet Mixer", Technical Transactions Nov. 2017, pp. 95-106.

* cited by examiner

METHOD OF DESULFURIZING AN OIL COMPOSITION

CROSS-REFERENCE TO RELATED APPLICATIONS

This application is a U.S. national phase application filed under 35 U.S.C. § 371 of International Application Number PCT/IB2021/056836 filed Jul. 28, 2021, designating the United States, which claims priority from Australian Application Number 2020902648, filed Jul. 28, 2020.

TECHNICAL FIELD

The invention relates to a method of desulfurizing an oil composition, the method comprising flowing an oil composition comprising sulfur through a conduit comprising a constricted region so that oil-phase bubbles form in the constricted region and collapse in a turbulent zone downstream of the constricted region, contacting the oil composition with an immiscible deep eutectic solvent in the turbulent zone to extract sulfur from the oil composition into association with the deep eutectic solvent, and separating the deep eutectic solvent and the extracted sulfur from the desulfurized oil composition. The method also relates to system for desulfurizing an oil composition.

BACKGROUND OF INVENTION

Fuels derived from crude oil generally contain a range of different sulfur-containing compounds. The combustion of fuels with high sulfur levels produces harmful environmental pollutants, and fuel refiners and blenders are subject to increasingly stringent regulation of sulfur specifications.

This issue is particularly severe in the shipping industry where low value, high sulfur refinery products such as fuel oil are typically combusted. Implementation of the MARPOL Annexe VI regulations will reduce the allowable sulfur content of maritime fuels from 3.5% to 0.5%. Refineries are generally unprepared to meet this specification, since current technologies for fuel oil desulfurization cannot achieve such low sulfur levels. Low-sulfur distillates must therefore be blended with fuel oil at uneconomically high blend ratios to meet the sulfur specifications.

Commercial hydrodesulphurization technology is effective for reducible sulfur-containing species such as thiols, sulfides, and disulfides, but unsuited to remove refractory aromatic species including thiophenes. Oxidative desulfurization technology is in principle capable of targeting a greater range of sulfur-containing species, but suffers from a number of disadvantages including the high costs associated with the hydrogen peroxide oxidant and oxidative degradation of the fuel oil properties. There is therefore an urgent need for commercial technologies capable of reducing the sulfur content of heavy fuel fractions closer towards the 0.5% target.

Some recent efforts toward this goal have focused on selective liquid-liquid extraction technologies. Various ionic solvents, including conventional organic salt ionic liquids, have shown promise as extractants for desulfurization. However, it remains a challenge to satisfactorily reduce the sulfur levels in fuel oils and other heavy refinery products due to mass transfer limitations and the poor extractability of refractory and high molecular weight sulfur-containing species from the oil matrix. Previous approaches to overcoming these difficulties are generally unattractive due to the high energy inputs, process complexity and costs associated with high-intensity mixing of large quantities of oil and extractant.

While the above discussion relates specifically to fuel oils for the shipping industry, it will be appreciated that similar considerations apply to a variety of oil compositions which require desulfurization.

There is therefore an ongoing need for new methods of desulfurizing an oil composition which at least partially address one or more of the above-mentioned short-comings, or provides a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

In accordance with a first aspect, the invention provides a method of desulfurizing an oil composition, the method comprising: flowing an oil composition comprising sulfur through a conduit comprising a constricted region, wherein oil-phase bubbles form in the constricted region and collapse in a turbulent zone downstream of the constricted region; contacting the oil composition with an immiscible deep eutectic solvent in the turbulent zone, thereby extracting at least a portion of the sulfur from the oil composition into association with the deep eutectic solvent; and separating the deep eutectic solvent and the extracted sulfur from the desulfurized oil composition.

The turbulent mixing of the oil composition and the deep eutectic solvent induced by hydrodynamic cavitation provides highly efficient extraction of sulfur-containing species from oil compositions. Advantageously, this desulfurization approach can achieve highly efficient sulfur extraction in a volumetrically small extraction zone, so that a large quantity of oil can be desulfurized in a small-scale process. Moreover, the method does not require specialised process equipment or high energy inputs, but relies instead on cavitating flow through a conduit. This can be implemented with simple equipment, such as steel pipe and conventional pumps, which is routinely used in the refining industry.

The properties of the desulfurized oil composition can be further tailored in the methods of the invention by controlling the cracking reactions which naturally occur in the extraction zone due to the extreme localised temperature and pressure conditions. In particular, various additives, including oxidants or hydrogen donors, may be added to produce particularly deep desulfurization and/or viscosity control of the desulfurized oil composition. The presence of a hydrogen donor in the turbulent zone quenches radicals formed in the cracking reactions and may thus enhance cracking and induce desirable macro-molecule cleavage. These reaction-enhanced modes of extraction synergistically complement the primary liquid-liquid extraction mechanism, thereby producing high value desulfurized oil compositions.

In some embodiments, contacting the oil composition with the deep eutectic solvent comprises introducing one or more streams of the deep eutectic solvent into the oil composition downstream of the constricted region. The one or more streams may be introduced by injection directly into the turbulent zone, for example high pressure injection.

In some embodiments, a flow of the deep eutectic solvent is directed through a flow constriction to produce solvent-phase bubbles in the one or more streams of the deep eutectic solvent introduced into the oil composition. The solvent-phase bubbles and the oil-phase bubbles may collapse coincidentally in the turbulent zone to enhance extraction of the sulfur from the oil composition.

In some embodiments, the one or more streams of the deep eutectic solvent are introduced into the oil composition by injection counter-current to the flow of the oil composition in the conduit.

In some embodiments, the deep eutectic solvent comprises a eutectic mixture of a quaternary ammonium salt and a hydrogen bond donor. The hydrogen bond donor may be a glycol, such as ethylene glycol. In some embodiments, the deep eutectic solvent comprises tetrabutylammonium bromide/ethylene glycol or choline chloride/ethylene glycol.

In some embodiments, the method further comprises contacting the oil composition with a hydrogen donor in the turbulent zone, wherein the hydrogen donor reduces the viscosity of the desulfurized oil composition. The hydrogen donor may be a hydrocarbon hydrogen donor solvent, such as a refinery distillate.

In some embodiments, the method further comprises contacting the oil composition with an oxidant in the turbulent zone, wherein the oxidant oxidises sulfur-containing molecules in the oil composition to produce oxidised sulfur species and the oxidised sulfur species are at least partially extracted into the deep eutectic solvent. The oxidant may be added at a molar ratio of less than 0.5:1 relative to the sulfur in the oil composition, or less than 0.3:1 relative to the sulfur in the oil composition. In some embodiments, the oxidant is $H_2O_2$.

In some embodiments, the deep eutectic solvent is a magnetic deep eutectic solvent. The magnetic deep eutectic solvent may comprise a eutectic mixture of a quaternary ammonium salt comprising tetrahaloferrate(III) anions and a hydrogen bond donor.

In some embodiments, the magnetic deep eutectic solvent is separated from the desulfurized oil composition by magnetically-assisted separation.

In some embodiments, the method further comprises stimulating the oil composition with ultrasound in and/or downstream of the turbulent zone, thereby enhancing extraction of the sulfur from the oil composition.

In some embodiments, the method further comprises heating the oil composition flowing through the conduit upstream of and/or in the constricted region.

In some embodiments, the temperature is in the range of 45 to 60° C. when contacting the oil composition with the deep eutectic solvent in the turbulent zone.

In some embodiments, the deep eutectic solvent has a temperature dependent density. The deep eutectic solvent may have a density which differs from the density of the desulfurized oil composition by less than 0.08 g/cm$^3$ when contacting the oil composition with the deep eutectic solvent in the turbulent zone, for example in a temperature in the range of 45 to 60° C. The deep eutectic solvent may have a density which differs from the density of the desulfurized oil composition by more than 0.08 g/cm$^3$ when separating the deep eutectic solvent and the extracted sulfur from the desulfurized oil composition, for example at a temperature in the range of 15 to 45° C., or 30 to 45° C.

In some embodiments, the deep eutectic solvent has a temperature dependent viscosity, such that the viscosity is relatively lower when contacting the oil composition with the deep eutectic solvent in the turbulent zone, for example in a temperature in the range of 45 to 60° C., and relatively higher when separating the deep eutectic solvent and the extracted sulfur from the desulfurized oil composition, for example at a temperature in the range of 15 to 45° C., or 30 to 45° C. In some such embodiments, the deep eutectic solvent is selected from choline chloride/glycerol, choline chloride/urea and choline chloride/malonic acid.

In some embodiments, the method further comprises, before separating the deep eutectic solvent from the desulfurized oil composition, flowing the oil composition through a second constricted region in the conduit and contacting the oil composition with a second portion of immiscible deep eutectic solvent in a second turbulent zone downstream of the second constricted region.

In some embodiments, flowing the oil composition through the conduit comprises circulating an inventory of the oil composition repeatedly through the conduit. The volume of oil composition in the turbulent zone of the conduit may be less than 1 of the volume of the inventory.

In some embodiments, the method further comprises the oil composition is a fuel oil and the desulfurized oil composition has a sulfur content of no more than 1.97 wt. %, or no more than 1.47 wt. %, or no more than 0.97 wt. %.

In some embodiments, the method comprises extracting at least one further component selected from nitrogen-containing species, metals such as vanadium, nickel and iron, and residual catalyst fines from the oil composition into association with the deep eutectic solvent.

In accordance with a second aspect, the invention provides a two-stage process for desulfurizing an oil composition, comprising: in a first stage, desulfurizing an oil composition by a method according to any embodiment of the first aspect to produce a first desulfurized oil composition; and in a second stage, desulfurizing the first desulfurized oil composition by a method according to any embodiment of the first aspect to produce a second desulfurized oil composition.

In some embodiments, a hydrogen donor is added in the second stage for contact with the first desulfurized oil composition in the turbulent zone, wherein the hydrogen donor reduces the viscosity of the second desulfurized oil composition.

In some embodiments, an oxidant is added in the second stage for contact with the first desulfurized oil composition in the turbulent zone.

In some embodiments, the deep eutectic solvent in the second stage is tetrabutylammonium bromide/sulfolane.

In accordance with a third aspect, the invention provides a system for desulfurizing an oil composition, the system comprising: a conduit comprising a constricted region; a pump for flowing an oil composition comprising sulfur through the conduit; and one or more injection ports for introducing a stream of deep eutectic solvent to the conduit; wherein the system is operable to: (i) flow the oil composition through the conduit such that oil-phase bubbles form in the constricted region and collapse in a turbulent zone downstream of the constricted region; and (ii) contact the oil composition with the deep eutectic solvent in the turbulent zone, thereby extracting at least a portion of the sulfur from the oil composition into association with the deep eutectic solvent.

In some embodiments, the injection ports introduce the stream of deep eutectic solvent to the conduit downstream of the constricted region, for example by injection directly into the turbulent zone.

In some embodiments, at least one, or each, of the injection ports comprises a flow constriction configured to produce solvent-phase bubbles in the stream of deep eutectic solvent introduced into the conduit. The injection ports may be configured such that the solvent-phase bubbles and the oil-phase bubbles collapse coincidentally in the turbulent zone.

In some embodiments, the system further comprises one or more inlets for introducing an oxidant or a hydrogen donor to contact the oil composition in the turbulent zone.

In some embodiments, the system further comprises one or more ultrasonicator devices for stimulating the oil composition with ultrasound in and/or downstream of the turbulent zone.

In some embodiments, the system further comprises a heater for heating the oil composition flowing through the conduit upstream of and/or in the constricted region.

In some embodiments, an internal diameter of the constricted region is adjustable to control the size and/or distribution of the oil-phase bubbles.

In some embodiments, the system further comprises a separator for separating the deep eutectic solvent and the extracted sulfur from the desulfurized oil composition. The separator may be a magnetic separator. The separator may be a triphase liquid-liquid separator for separating a phase rich in desulfurized oil composition, a phase rich in deep eutectic solvent, and a phase rich in sulfur-containing compounds.

In some embodiments, the system comprises a conduit portion, between the turbulent zone and the separator, configured for temperature control of the oil composition and deep eutectic solvent. The temperature control avoids or acceptably limits migration of the extracted sulfur back into the desulfurized oil composition ahead of the separation.

In some embodiments, the system further comprises a second constricted region in the conduit downstream of the turbulent zone. The system may further comprise one or more second injection ports for introducing a stream of deep eutectic solvent to the conduit downstream of the second constricted region.

In some embodiments, the system further comprises a reservoir for holding an inventory of the oil composition to be flowed, by the pump, through the conduit. The system may be configured to circulate the inventory of the oil composition repeatedly through the conduit.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
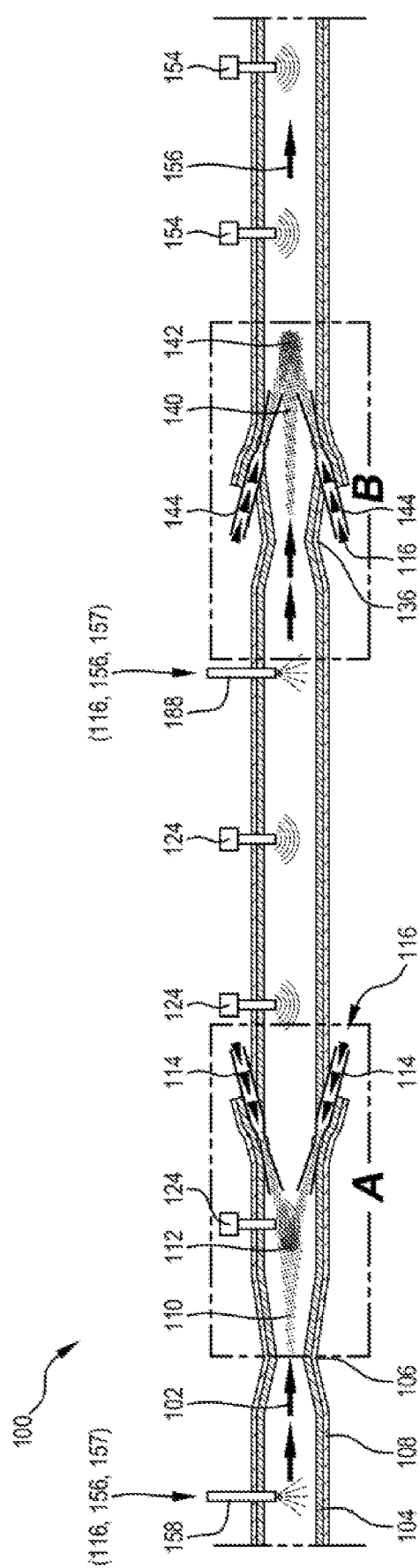
FIG. 1 schematically depicts a conduit with two constricted regions, in a system for desulfurizing fuel oil according to embodiments of the invention.

The present invention relates to a method of desulfurizing an oil composition. An oil composition comprising sulfur is flowed through a conduit comprising a constricted region, causing bubbles to form in the oil composition. Downstream of the constricted region, where the conduit widens again, the bubbles collapse in a turbulent zone of the conduit. The oil composition is contacted with an immiscible deep eutectic solvent in the turbulent zone, thereby extracting at least a portion of the sulfur from the oil composition into association with the deep eutectic solvent. The deep eutectic solvent and the extracted sulfur are then separated from the desulfurized oil composition.

Oil Composition

The invention provides a method of desulfurizing an oil composition. Typically, the oil composition is a product of crude oil refining, and may include various refinery fractions and blends including hydrocarbon distillates, diesel, jet fuel, various fuel oils including intermediate and heavy fuel oils, and residuum.

In some embodiments, the oil composition is a heavy oil product such as fuel oil, in particular intermediate fuel oil (IFO) or heavy fuel oil (HFO). These relatively low value oil compositions are typically used in maritime fuels. IFO and HFO are composed mainly of heavy residual components of cracking and distillation, including substantial quantities of refractory sulfur-containing species. Sulfur contents of over 3 wt. % are typical. The present invention has particular application in desulfurizing fuel oil blends to assist with meeting increasingly demanding environmental regulations around sulfur content of maritime fuels. Moreover, the methods advantageously avoid, or in some cases substantially limit, the requirement for oxidants such as $H_2O_2$ which may degrade fuel oil properties in conventional oxidative desulfurization methods.

In other embodiments, the oil composition is a diesel or jet fuel composition. Such oil compositions must generally meet highly demanding specifications as to sulfur content, and embodiments of the present invention provide deep desulfurization which can assist to meet these requirements.

The oil compositions to be processed comprise sulfur. The sulfur content, for example as measured by ASTM D4294, may be greater than 1 wt. %, or greater than 2 wt. %, or greater than 3 wt. %. A substantial proportion of the sulfur may be in the form of refractory heteroaromatic sulfur-containing species, in particular thiophenes. As used herein, thiophenes includes thiophene and substituted thiophene species, including polycyclic thiophenes such as benzothiophenes, dibenzothiophenes and the like.

The oil composition to be desulfurized according to the present methods may a treated oil composition, including a hydrodesulfurized oil composition. The present methods may be complimentary to established desulfurization technologies such as hydrodesulfurization. For example, hydrodesulfurization may be used initially to reduce the overall sulfur content by targeting aliphatic and other reducible sulfur-containing species, with the present methods then used to remove refractory aromatic sulfur-containing species to achieve a high overall removal of sulfur.

Conduit Comprising a Constricted Region

The method of the invention comprises a step of flowing the oil composition through a conduit comprising a constricted region. The constricted region is a portion of the conduit with a narrower cross-sectional area than that of the conduit upstream and downstream of the constricted region. Accordingly, the flow velocity of the oil composition increases as it passes through the constricted region, causing a corresponding drop in pressure according to Bernoulli's principle and the Venturi effect. The high velocity fluid creates a jet flow out of the constricted region into the conduit downstream of the constricted region, where the flow velocity decreases and the pressure increases again.

The flow rate of the oil composition in the conduit and the constriction geometry are selected such that the fluid pressure in the constricted flow drops below the saturation vapour pressure of the oil composition. As a result, gas bubbles (or voids) are formed and rapidly expand in the flowing composition. Downstream of the constricted region, as the pressure of the oil composition returns above the saturated gas pressure, these bubbles collapse. The collapsing bubbles are characterised by localised and transient extreme conditions of temperature and pressure, with bubble wall temperatures in excess of 1000K and instantaneous bubble pressures of between 2000 and 8000 bar considered likely. These conditions induce reactions in the oil composition and other compositions present in the vicinity of bubble collapse, including bond-breaking radical forming reactions of heavy oil components and refractory sulfur-containing species. Moreover, the energy release caused by the bubble collapse produces turbulence in the fluid in a turbulent zone of the conduit downstream of the constricted region, facilitating mass transfer between the phases there present.

The formation and collapse of gas bubbles according to this process does not rely on the presence of a gas (i.e. a substance that, in isolation, is inherently gaseous at the temperature and pressure of the process) as a component in the flow through the constricted region. In some embodiments, therefore, a gas is not added to the oil composition before the oil composition flows through the constricted region.

The constriction geometry and operating conditions can be selected for any particular implementation to ensure that hydrodynamic cavitation occurs. In particular, in some embodiments, the conduit is designed and operated so that the dimensionless cavitation number ($C_v$), according to the below formula, is less than 1:

$$Cv = \frac{P_2 - P_v}{\frac{1}{2}\rho V_0^2}$$

In this formula, $P_2$ is the discharge pressure into the turbulent zone downstream of the constriction, $P_v$ is the vapor pressure of the liquid, $V_0$ is the velocity at the throat, and $\rho$ is the density of liquid.

The conduit may be a metal pipe, for example a steel pipe. It will be appreciated that the internal diameter of the pipe will depend on the scale at which the desulfurization is to be conducted. In one set of embodiments, the conduit has an internal diameter in the range of 70 to 150 mm, such as in the range of 100 to 120 mm.

The constricted region of the conduit may be formed as a narrowing in the conduit walls or by an insert placed in the conduit, e.g. an orifice plate. In either case, the constricted region may comprise a curved surface where the conduit narrows from its initial larger cross-sectional area to the smaller cross-sectional area of the constricted region, this curved surface being configured to minimise turbulence in the accelerating flow of the oil composition entering the constricted region. The dimensions of the constricted region relative to the conduit internal diameter may be selected based at least in part on the properties of the fluid flowing through the constriction, such as the oil viscosity and the presence of any additives or accumulated deep eutectic solvent. In one set of embodiments, the constricted region has a minimum internal diameter in the range of 15 to 30%, such as 20 to 25%, of the internal diameter of the conduit. It is also envisaged that the geometry of the constricted region may be adjustable in response to the fluid composition or properties (e.g. its viscosity) to produce a desired bubble size and distribution, and thus control the resulting cavitational bubble collapse. The internal diameter of the constricted region may be adjusted during desulfurization, for example while continuously recirculating an inventory of the oil composition through the conduit, as the properties of the treated oil composition change.

The flowing fuel oil may optionally be heated when it flows through the constricted region, for example by a heater on the walls of the conduit immediately before and/or on the constricted region. Heating of the oil composition reduces its viscosity to improve flowability through the constricted region and facilitates bubble formation by raising the temperature of the oil composition closer to the bubble point.

In some embodiments, as will be described in greater detail hereafter, one or more materials may be added to the oil composition before the constricted region, so that the combined compositions are present in the flow through the constricted region and subjected together to cavitation-induced reactions and/or mixing in the turbulent zone. The added material may include one or more of the deep eutectic fluid for extracting sulfur, an oxidant and a hydrogen donor.

Contacting the Oil Composition with a Deep Eutectic Solvent

The method of the invention comprises a step of contacting the oil composition with an immiscible deep eutectic solvent in the turbulent zone. Sulfur is thereby extracted from the oil composition into association with the deep eutectic solvent, so that the oil composition is desulfurized.

Deep eutectic solvents are liquids comprising a eutectic mixture of two components, which thus has a lower melting temperature than either component individually. Suitable deep eutectic solvents include mixtures of a quaternary organic salt, in particular a quaternary ammonium or phosphonium salt, with an organic hydrogen bond donor compound, such as an alcohol, an acid, an amide, a sulfone or a urea. Deep eutectic solvents are ionic solvents, and thus share some properties with conventional organic salt ionic liquids such as low vapour pressure, polarity and immiscibility with hydrocarbons. However, deep eutectic solvents provide significant advantages over ionic liquids including low cost, simple methods of production based on mixing the components in the correct proportions, and greater acceptance in some use environments (such as oil refineries) as the individual components are already familiar.

In some embodiments, the deep eutectic solvent comprises a eutectic mixture of a quaternary ammonium salt and a hydrogen bond donor. A wide variety of such deep eutectic solvents have previously been reported, with different quaternary ammonium salts, hydrogen bond donors and ratios between the two components, and it is considered that such known materials are generally applicable in the present methods. Suitable quaternary ammonium salts include optionally substituted tetraalkyl ammonium salts such as choline and tetra-n-alkyl ammonium (e.g. tetrabutyl ammonium) salts. Suitable hydrogen bond donors include glycols, such as ethylene glycol, propylene glycol and the like, as well as acids such as phenylacetic acid and sulfones such as sulfolane.

In some embodiments, the deep eutectic solvent is a non-magnetic deep eutectic solvent. The non-magnetic deep eutectic solvent may be a eutectic mixture of a quaternary ammonium chloride salt and a hydrogen bond donor, where the quaternary ammonium cation and the hydrogen bond donor are as described above. Examples of such deep eutectic solvents are (a) tetrabutylammonium bromide/ethylene glycol, optionally at a mol ratio of between about 1:4 and 1:16, such as between 1:4 and 1:7, for example 1:4, (b) choline chloride/ethylene glycol, optionally at a mol ratio of between about 1:2 and 1:3, for example 1:2, and (c) tetrabutylammonium bromide/sulfolane, optionally at a mol ratio of about 1:7. Non-magnetic deep eutectic solvents may be preferred in scenarios where catalytically-assisted desulfurization and magnetically-assisted separation are not required.

In some embodiments, the deep eutectic solvent is a magnetic deep eutectic solvent. Magnetic deep eutectic solvents typically comprise tetrahaloferrate(III) anions which render the solvent susceptible to external magnetic fields. Such solvents can be prepared by adding an iron(III) halide, preferably $FeCl_3$, to a eutectic mixture of quaternary ammonium halide salt and a hydrogen bond donor. The halide anion and the iron(III) halide combine in situ to form the magnetically susceptible tetrahaloferrate(III) anion. For example, magnetic equivalents to the exemplary non-magnetic deep eutectic solvents referred to above can be prepared by adding $FeCl_3$ to tetrabutylammonium bromide/ethylene glycol and choline chloride/ethylene glycol, optionally at a mol ratio of about 0.05:1 relative to the ammonium salt. These magnetic solvents thus comprise $FeCl_3Br^-$ and $FeCl_4^-$ anions respectively. High iron-content formulations, e.g. with an $FeCl_3$:ammonium salt ratio of 1:1, may be desirable in cases where particularly strong magnetic properties are advantageous, for example when using magnetically assisted separation.

Magnetic deep eutectic solvents provide a number of advantages in embodiments of the presently disclosed method. Notably, the iron species present in the solvent can catalyse desirable reactions which assist in the extraction of sulfur, including cracking reactions of hydrocarbons or sulfur-containing species, hydrogenation reactions in embodiments where a hydrogen donor is added to the oil compositions, and oxidation reactions of sulfur-containing species in embodiments where a small amount of oxidant is added to the oil composition. In the latter case, the oxidised sulfur-containing species, e.g. sulfones, are more polar than their precursors and thus more readily extracted into the deep eutectic solvent. The iron species may also inhibit undesirable processes, such as in situ coking reactions. Moreover, the magnetic susceptibility of the deep eutectic solvent can be exploited in the subsequent separation step as will be explained in greater detail hereafter.

The deep eutectic solvent may be selected at least in part based on a suitable density, or a density-temperature profile, which accommodates both the extraction of sulfur and the subsequent separation of the deep eutectic solvent from the oil composition and the sulfur. Oil compositions typically have a density below 1 $g/cm^3$, with HFO having a density in the range of 0.96 to 0.98 $g/cm^3$ at 50° C. The density of deep eutectic liquids is generally above 1 $g/cm^3$, and in at least some embodiments exhibit a strong temperature dependency whereby the density is lower at elevated temperatures. It will be appreciated that extraction efficiency is enhanced by similarity in densities of the oil composition and deep eutectic solvent in the turbulent zone, but separation efficiency is enhanced by a greater difference in density. A particularly preferred class of deep eutectic solvents are thus those with a density that approaches the oil composition density at extractions conditions, such as 45 to 60° C., while diverging significantly at separation conditions, such as 30 to 45° C. A range of deep eutectic solvents comprising ethylene glycol as the hydrogen bond donor afford these properties. An example of such a deep eutectic solvent is tetrabutylammonium bromide/ethylene glycol.

The deep eutectic solvent may be selected at least in part based on a suitable viscosity, or viscosity-temperature profile, which accommodates both the extraction of sulfur and the subsequent separation of the deep eutectic solvent from the oil composition and the sulfur. Certain deep eutectic solvents exhibit strong dependency of viscosity on temperature in the temperature range of the process, so that the viscosity is closer to that of the oil composition at extractions conditions, such as 45 to 60° C., while diverging significantly (increasing) at separation conditions, such as 30 to 45° C. The higher viscosity may assist to achieve efficient liquid-liquid separation. For example, deep eutectic solvents comprising choline chloride with hydrogen bond donors such as glycerol, urea and malonic acid afford these properties (to a greater degree than choline chloride/ethylene glycol).

Non-limiting examples of suitable deep eutectic solvents for various embodiments of the invention are shown in Table 1.

TABLE 1

| Quaternary salt | Hydrogen bond donor (HBD) | Example salt:HBD mol ratio | $FeCl_3$ added? (salt:$FeCl_3$ mol ratio) | Advantages |
|---|---|---|---|---|
| TBAB | Ethylene glycol | 1:4 | No | Favourable density profile for fuel oil extraction/separation. Good extraction of a wide range of sulfur compounds |

TABLE 1-continued

| Quaternary salt | Hydrogen bond donor (HBD) | Example salt:HBD mol ratio | FeCl$_3$ added? (salt:FeCl$_3$ mol ratio) | Advantages |
|---|---|---|---|---|
| TBAB | Ethylene glycol | 1:8 or 1:16 | No | Alternate formulations of above composition (reduced cost preferred under low oil price scenarios) |
| TBAB | Ethylene glycol | 1:4 | Yes (1:0.05) | Favourable density profile for fuel oil extraction/separation. Catalysed oxidation reactions |
| TBAB | Ethylene glycol | 1:8 or 1:16 | Yes (1:0.05) | Alternate formulations of above composition (reduced cost preferred under low oil price scenarios) |
| Choline chloride | Ethylene glycol | 1:2 | No | Good extraction of both sulfur- and nitrogen-containing compounds |
| Choline chloride | Ethylene glycol | 1:2.5 or 1:3 | No | Alternate formulations of above composition (reduced cost preferred under low oil price scenarios) |
| Choline chloride | Ethylene glycol | 1:2 | Yes (1:0.05) | Good extraction of both sulfur- and nitrogen-containing compounds, Catalysed oxidation reactions |
| Choline chloride | Ethylene glycol | 1:2.5 or 1:3 | Yes (1:0.05) | Alternate formulations of above composition (reduced cost preferred under low oil price scenarios) |
| Choline chloride | Ethylene glycol | 1:4 | Yes (1:1) | High ferromagnetic iron content formulation |
| Choline chloride | Glycerol | 1:2 | No | Enhanced temperature-dependency of viscosity profile |
| Choline chloride | Glycerol | 1:2 | Yes (1:0.05) | Enhanced temperature-dependency of viscosity profile |
| Choline chloride | Malonic acid | 1:1 | No | Enhanced temperature-dependency of viscosity profile |
| Choline chloride | Malonic acid | 1:1 | Yes (1:0.05) | Enhanced temperature-dependency of viscosity profile |
| TBAB | sulfolane | 1:7 | No | Deep desulfurization of hard-to extract refractory sulfur species |

TBAB = tetrabutyl ammonium bromide

The deep eutectic solvent is contacted with the oil composition in the turbulent zone to obtain the beneficial sulfur extraction provided by the high-shear mixing environment, in some cases supplemented by reactions induced under the extreme conditions at the collapsing bubbles. To this end, the deep eutectic solvent may be added to the oil composition in a variety of different ways. For example, the deep eutectic solvent may be injected into the oil composition in the conduit upstream of the constricted region, so that the two-phase mixture passes through the constricted region and are together subjected to bubble-formation and downstream cavitation in the turbulent zone.

In other embodiments, the deep eutectic solvent is introduced downstream of the constricted region, in particular by injecting one or more streams of the solvent directly into the turbulent zone. The targeted injection of the deep eutectic solvent can be controlled to ensure optimum contact with the collapsing microbubbles in the oil composition, maximising the extraction of sulfur in a small volumetric portion of the conduit. In some embodiments, the deep eutectic solvent is injected as a high pressure jet into the turbulent zone to enhance the turbulence. The stream or high pressure jet of deep eutectic solvent may optionally be injected in a generally counter-current direction to the overall direction of flow of the oil composition axis in the conduit, thus further contributing to the mixing and turbulence in the turbulent zone.

In some embodiments, the flow of the deep eutectic solvent is itself cavitated as it is injected into the oil composition downstream of the constricted region in the primary conduit. The deep eutectic solvent may be directed through a flow constriction in the injector flow channel, the resultant pressure drop producing bubbles in the deep eutectic solvent which subsequently collapse in the jet of fluid injected into the oil composition. In this case, the energy release from the cavitating extractant itself contributes to the desulfurization of the oil-composition. While generally having relatively low vapour pressures, deep eutectic solvents typically contain a proportion of free molecular solvents, or can be supplemented with other volatile components, which can vaporise under cavitational flow conditions.

The injection of the cavitating deep eutectic solvent into the oil composition may be configured and controlled such that the bubbles in the deep eutectic solvent and those in the oil composition collapse coincidentally, i.e. in at least a portion of the turbulent zone where the two fluids combine and mix. The overlapping collapse of both sets of bubbles in the initial mixing zone of the two fluids contributes to an improved extraction of sulfur as a result of the high-shear mixing environment and/or extraction-enhancing reactions induced by the extreme localised conditions.

The contact between the oil composition and the immiscible deep eutectic solvent in the turbulent zone results in the extraction of at least a portion of the sulfur from the oil composition into association with the deep eutectic solvent. Without wishing to be bound by any theory, it is believed that one significant mode of extraction is non-reactive extraction, whereby intact, native sulfur-containing species are efficiently and selectively extracted into association with the deep eutectic solvent as a result of the favourable mass-transfer conditions produced in the turbulent zone. However, it is believed that various reactions, enhanced by the cavitational energy release, may also contribute to the desulfurization. These reactions may include bond-breaking, or cracking, reactions of native sulfur-containing species in the oil composition which liberate smaller sulfur-containing derivatives. Moreover, the presence of a small amount of oxidant may oxidise refractory sulfur-containing species to form more polar oxidised species. These cracked and/or oxidised sulfur-containing derivatives can then be more readily extracted from the oil composition than their native precursors.

Whether by reactive or non-reactive mechanisms, the sulfur is extracted from the oil composition into association with the deep eutectic solvent. At least a portion of the extracted sulfur-containing species may be dissolved in the deep eutectic solvent after the initial extraction. However, it should be appreciated that such dissolution is not required to effectively desulfurize the oil composition. Indeed, it has been observed that a post-extraction mixture can comprise three distinct liquid phases, being phases rich in the desulfurised oil composition, the deep eutectic solvent and extracted aromatic sulfur-containing species respectively. It is therefore believed that at least a portion of the extracted sulfur may be present in species, for example non-oxidised aromatic species, which are electrostatically attracted to the deep eutectic solvent but not fully dissolved therein after extraction in the turbulent zone.

The temperature of the fluids in the turbulent zone may be adjusted to produce a favourable extraction. In some embodiments, the bulk temperature of the oil composition in the turbulent zone during contact with the deep eutectic solvent may be in the range of 30 to 70° C., such as 45 to 60° C. These temperatures are generally below the temperatures where significant damage is done to the fuel oil properties under high shear conditions. Moreover, in at least some embodiments the density of the deep eutectic solvent may approach the density of the fuel oil at these temperatures, further enhancing mass transfer in the turbulent zone.

The oil composition may be contacted with the deep eutectic solvent at a suitable ratio according to the overall process configuration and required degree and difficulty of desulfurization. In some embodiments, as will be explained in greater detail hereafter, the oil composition is repeatedly cycled through the constricted region with a portion of the deep eutectic solvent added in each pass. In some such embodiments, the final ratio of oil composition to deep eutectic solvent may be in the range of about 0.3:1 to 0.8:1 (w/w).

Oxidatively-Enhanced Extraction

The present methods generally involve shear-induced liquid-liquid extraction of non-oxidised sulfur-containing species, as distinguished from oxidative desulfurization methods which rely on selective oxidation of sulfur species to sulfones which are then extracted based on a polarity difference. The present methods thus advantageously limit the oxidative degradation of desirable hydrocarbon components which is typically associated with oxidative desulfurization. Moreover the methods avoid or minimise the costs and process complexity associated with the use of the oxidant and its by-products.

Nevertheless, it may be advantageous in some embodiments to add a relatively small amount of oxidant to the oil composition for reaction with refractory components of the oil composition in the turbulent zone. In particular, where deep desulfurization of the oil composition is required, the oxidative extraction mechanism may supplement the cavitationally-induced liquid-liquid extraction of native and non-oxidised sulfur-containing species. A desirably low sulfur content in the desulfurized oil composition is thus achieved while still avoiding undesirable side-effects of using a large amount of oxidant. The amount of oxidant added may be small compared to typical amounts used in oxydesulfurization processes, where molar ratios of oxidant to thiophenic sulfur are typically about 3:1 or higher. Thus, in some embodiments, the oxidant may be added in a molar ratio of less than 0.5:1, or less than 0.3:1, such as between 0.01:1 and 0.3:1, relative to the sulfur in the oil composition.

The oxidant may in principle include a wide variety of oxidants, such as hydrogen peroxide, dioxygen and nitric acid. In some embodiments, the oxidant comprises hydrogen peroxide ($H_2O_2$). The oxidant may be introduced to the oil composition before or immediately after the constricted region such that it is available for reactions in the turbulent zone.

In embodiments where an oxidant is added, a catalyst may be present to enhance the oxidation reactions. In particular, a magnetic deep eutectic solvent as disclosed herein may advantageously provide both iron-based catalytic species for enhanced oxidation reactions as well as the extraction solvent itself.

Hydrogen Donor

In some embodiments, a hydrogen donor is added to the oil composition to react in the turbulent zone. As previously disclosed herein, the extreme localised conditions in the turbulent zone induce cracking reactions, including C—C and C—S bond-breaking reactions, of various components in the oil composition to form reactive radical species. The role of the hydrogen donor is to provide a source of labile hydrogen atoms to react with (or quench) the radicals. This may play a number of complementary roles in the methods of the invention. Firstly, the hydrogen donor may contribute to improved desulfurization. When refractory sulfur-containing species are cracked, quenching of the resultant radicals by hydrogen transfer assists in liberating lower molecular weight sulfur-containing species, thereby improving their extractability. More generally, hydrogen quenching of a variety of cracked radical species in the oil composition prevents their condensation into larger species, and thus reduces the average molecular weight and viscosity of the desulfurized oil composition. Heavy fuel oil fractions in particular contain very high molecular weight components, such as asphaltenes, and hydrogen donor-assisted cracking of these species to smaller molecules is particularly beneficial in improving the viscous properties of the treated oil. The resultant viscosity can be controlled based on both the intensity of cavitational energy release in the turbulent zone as well as the amount of hydrogen donor added.

In some preferred embodiments, the methods of the invention are thus used to simultaneously desulfurize an oil composition and to tailor its physical properties, in particular its viscosity. While hydrogen donor-cavitation technology has previously been proposed to reduce the viscosity of heavy fuel oils, its use in the methods of the present invention to achieve both desulfurization and targeted viscosity control in a single, low volume process step is considered particularly advantageous. The simultaneous desulfurization and viscosity reduction may improve the long term stability of the desulfurized oil composition, for example in the case where very low sulfur fuel oil (VLSFO) is produced.

Suitable hydrogen donors are known in the art of petroleum refining, and may include substances such as methane, ethanol, formic acid, cycloalkyl aromatic compounds and the like. One class of suitable hydrogen donors are hydrocarbon hydrogen donor solvents, which contain species susceptible to dehydrogenation and thus hydrogen transfer to radicals. Examples of model hydrocarbon hydrogen donor solvents include polycyclic cycloalkyls such as tetrahydronaphthalene (tetralin), decahydronaphthalene (decalin) and dihydroanthracene, but various refinery distillates (e.g. gasoline) provide adequate hydrogen donor properties at low cost. In some embodiments, the desulfurized oil composition is destined for blending with low sulfur distillates, for example in maritime fuels. The use of distillate as hydrogen donor may advantageously provide viscosity reduction of the oil composition via a dilution that would have occurred anyway.

In general, it will be appreciated that the viscosity reduction achieved by radical quenching with a hydrogen donor solvent is significantly greater than that obtained simply by diluting the desulfurized oil composition with the same quantity of the hydrogen donor solvent under non-reactive conditions.

When a hydrogen donor is present, the temperature of the fluids in the turbulent zone may optionally be increased to a temperature higher than could be tolerated in its absence. For example, temperatures of greater than 100° C., while still remaining below conventional visbreaking temperatures, may be used to provide for enhanced desulfurization and viscosity reduction in the desulfurized oil product. Extraction at such elevated temperatures should generally be done under inert conditions, in particular by excluding oxygen.

In some embodiments, a desulfurized oil composition, produced according to the invention as generally disclosed herein, is subjected to a second desulfurization
 viscosity reduction step where the intermediate oil composition is desulfurized according to the invention in the presence of a hydrogen donor. Thus, for example, a first extraction step in the absence of a hydrogen donor may reduce the sulfur content of fuel oil to a value in the range of about 0.6 to 1 wt. %. Following separation, the desulfurized fuel oil is then combined with a middle distillate hydrogen donor, for example by injecting it immediately upstream of the constricted zone, and subjected to desulfurization as disclosed herein at an elevated temperature in the turbulent zone. The oil composition and hydrogen donor may be combined at a ratio of about 4:1 w/w. The turbulent mixing in the extraction zone, at high temperature and in the presence of the hydrogen donor, cleaves and hydrogenates high molecular weight components in the fuel oil, such as asphaltenes, and results in the formation of a low viscosity, low sulfur fuel oil (e.g. less than about 0.5 wt. % sulfur).

Enhanced Downstream Sulfur Extraction

After the initial extractive contact between the oil composition and the deep eutectic solvent under cavitating conditions in the turbulent zone, the mixed composition continues to flow downstream through the conduit. The high turbulence and transient extreme conditions caused by bubble collapse diminish with distance from the constricted region, limiting the possibility of further extraction of sulfur-containing species from the oil composition.

In some embodiments, therefore, the method of the invention further comprises stimulating the oil composition with ultrasound in and/or downstream of the turbulent zone. The ultrasonic stimulation may be provided by ultrasonic horns or other known ultrasonication apparatus for inducing acoustic cavitation in a flowing liquid. The ultrasonic stimulation is itself capable of inducing a measure of cavitational bubble collapse, which complements the hydrodynamic cavitation produced via the constricted region. More importantly, it may be used to maintain turbulence in the fluid and thus extend the length of the turbulent zone where shear-induced sulfur extraction can occur. Accordingly, the overall sulfur extraction from the oil composition is synergistically enhanced by the use of both hydrodynamic and ultrasonic cavitation, and/or the amount of deep eutectic solvent extractant required to achieve a target desulfurization is reduced.

In some embodiments, the oil composition is passed through two or more successive constricted regions of the conduit, with the oil composition contacted with deep eutectic solvent in a turbulent zone downstream of each constriction. Optionally, separate portions of the total volume of deep eutectic solvent are introduced to each turbulent zone, either upstream or immediately downstream of the respective constriction as disclosed herein. The use of multiple hydrodynamic cavitation extraction zones may provide enhanced overall desulfurization based on a single pass of the oil composition through the conduit.

The temperature of the mixed composition downstream of the turbulent zone may be controlled to avoid migration of extracted sulfur-containing species back into the desulfurized oil composition. The temperature of the post-extraction composition prior to the separation step may thus be maintained close to the temperature of extraction in the turbulent zone, for example in the range of 30 to 70° C., such as 45 to 60° C. In some embodiments, the extraction system comprises a conduit portion, for example a length of pipeline, downstream of the turbulent zone which provides a residence time between the turbulent zone and the separator in which the temperature of the mixed composition is controlled. The length of pipeline may be jacketed to provide a very precise temperature control. Thus, a high proportion of the sulphur compounds are maintained in association with the deep eutectic solvent ahead of the separator and not allowed (due to temperature control deviations) to migrate back into the oil phase.

Separation and Solvent Regeneration

The method of the invention includes a step of separating the deep eutectic solvent and the extracted sulfur from the desulfurized oil composition.

Since the oil composition and the deep eutectic solvent are substantially immiscible, these components can generally be separated by conventional liquid-liquid separation methods such as decantation or centrifugation. The extracted sulfur may be at least partially soluble or dispersed in the deep eutectic solvent, and is thus separated from the desulfurized oil composition together with the deep eutectic solvent. In some embodiments, a portion of the extracted sulfur-containing species may form a discrete third phase in the post extraction mixture. The three phases can again be separated separately using known liquid-liquid extraction techniques, for example triphase centrifugal separators.

The separation may take place at a lower temperature than the bulk temperature in the turbulent zone. The lower temperatures may assist with the phase separation as further explained below. In some embodiments where the heavy oil compositions are desulfurized, the temperature during extraction may be in the range of 30 to 45° C., taking care not to reduce the temperature below the pour point. For lighter oil compositions undergoing deep desulfurization, lower temperatures, such as between 15 and 30° C. may be beneficial.

In some embodiments, the formation of discrete liquid phases and their subsequent separation is assisted by significant density differences between the phases. Indeed, as already discussed herein, the selection of the particular deep eutectic solvent may be informed at least in part by its density difference from the desulfurized oil composition and the separate sulfur-rich phase (if formed). The density differences may advantageously be exploited to achieve high separation efficiencies in centrifugation-based separations.

In some such embodiments, the deep eutectic solvent has a temperature-dependent density which is exploited to accommodate both the extraction and separation steps. In particular, the deep eutectic solvent may have a density relatively close to that of the oil composition during extraction and relatively different during the separation step. In one example, HFO is desulfurized with deep eutectic solvent having ethylene glycol as the hydrogen bond donor, e.g. tetrabutylammonium bromide/ethylene glycol. At an extraction temperature of about 60° C. in the turbulent zone, these compositions have relatively similar densities of about 0.96-0.98 g/cm$^3$ and 1.00-1.04 g/cm$^3$ respectively, facilitating intimate contact and thus sulfur extraction in the turbulent mixing. Downstream, the extracted mixture phase-separates into three distinct phases: phases rich in desulfurized HFO, deep eutectic solvent and polycyclic thiophenes respectively. At a separation temperature of about 30° C., these phases have densities of about 0.96-0.98 g/cm$^3$, 1.06-1.1 g/cm$^3$ and >1.2 g/cm$^3$ (dibenzothiophene density is 1.25 g/cm$^3$) respectively. These significant density differences facilitate efficient centrifugal separation of the mixture into the separated compositions.

In embodiments where the deep eutectic solvent is magnetic, the deep eutectic solvent may optionally be separated from the desulfurized oil composition by magnetically-assisted separation techniques. Such techniques, which are known in the art, rely on a magnetic field to attract the deep eutectic solvent, and associated sulfur, and thus efficiently separate the components from the desulfurized oil composition.

After the separation step, the method may include a further step of regenerating the deep eutectic solvent. In particular, it may be desirable to remove species extracted from the oil composition, including but not limited to the extracted sulfur-containing species. Regeneration can be achieved by washing the separated deep eutectic solvent with an immiscible solvent such as dimethylformamide or acetonitrile. After extracting the deep eutectic solvent in one or more wash stages, the deep eutectic solvent is depleted in sulfur and can be recycled for contact with an oil composition according to the methods disclosed herein.

The method may include producing a sulfur-containing product containing at least a portion of the extracted sulfur. This product may include sulfur-containing components obtained from the primary separation and/or the deep eutectic solvent regeneration steps. For the case of fuel oil desulfurization, a product stream containing sulfur compounds (primarily thiophenes) in the range of 4-30 wt. % together with heavy oil components (e.g. asphaltenes) may be produced. Such a product may be useful in various applications, for example as a bitumen extender/modifier.

Desulfurized Oil Composition

As disclosed herein, the methods of the invention produce a desulfurized oil composition. Highly efficient desulfurization can be achieved, with low sulfur contents obtained using a simple and low-volume extraction zone. However, it will be appreciated that the degree of desulfurization to be targeted in any particular application may be determined by the nature of the oil composition and its intended application, as well as the process economics. Thus, the methods of the invention can be designed and controlled, according to the principles disclosed herein, to achieve a target sulfur content.

In the case of desulfurized fuel oil compositions, including IFO and HFO, these materials are typically blended with low-sulfur distillates to meet the sulfur specifications for maritime fuels. It will be appreciated that a lower initial sulfur content in the fuel oil advantageously reduces the blend ratio of distillate to fuel oil required to meet a given sulfur specification. Moreover, the optimum target sulfur content in a desulfurized fuel oil will depend on the price spread between the distillate blendstock and the desulfurized fuel oil. In a high spread scenario, there is a greater incentive to achieve deeper desulfurization and thus reduce the blend ratio.

MARPOL Annexe VI compliant maritime fuels have a maximum sulfur content of 0.5%. In various embodiments of the invention, the method thus targets a maximum sulfur content of about 1.97 wt. %, or 1.47 wt. %, or 0.99 wt. %, or 0.74 wt. %, or 0.6 wt. %, which are suitable for blending with low-sulfur distillates at blend ratios of 1:3, 1:2, 1:1, 2:1 and 4:1 respectively.

While desulfurization is the primary focus, the methods disclosed herein may also advantageously remove other undesirable species, particularly components of greater polarity than the bulk oil matrix, from the oil composition. For example, nitrogen-containing species such as pyridines, quinolines, pyrroles, indoles and carbazoles are expected to be efficiently extracted from the oil composition together with sulfur-containing species. Moreover, metals such as vanadium, nickel and iron, and residual catalyst fines (typically aluminium and silicon compounds) will also be extracted into the ionic deep eutectic solvent.

System

The present invention also relates to a system for desulfurizing an oil composition. The system comprises a conduit comprising a constricted region, a pump for flowing an oil composition comprising sulfur through the conduit, and one or more injection ports for introducing a stream of deep eutectic solvent to the conduit. The system is operable to flow the oil composition through the conduit such that oil-phase bubbles form in the constricted region and collapse in a turbulent zone downstream of the constricted region; and to contact the oil composition with the deep eutectic solvent in the turbulent zone, thereby extracting at least a portion of the sulfur from the oil composition into association with the deep eutectic solvent.

An embodiment of the invention will now be described with reference to FIG. 1, which depicts system 100 for desulfurizing fuel oil. Sulfur-containing fuel oil 102 is flowed through conduit 104 and thus into constricted region 106. Constricted region 106 may be a Venturi narrowing in the conduit walls as shown or it may be provided by an insert such as an orifice plate in the conduit. As a result of the reduced cross-sectional area in the constricted region, the fluid velocity increases and the fluid pressure drops according to the Venturi effect.

The fuel oil flow rate and the constriction geometry are selected such that the pressure in the fluid flowing through the constricted region drops below the saturation vapour pressure of the fuel oil, causing bubbles (or voids) 110 to be formed in fuel oil 102. The flowing fuel oil may optionally be heated by heater 108 before and as it enters the constricted region, to reduce the viscosity and predispose the fuel oil to bubble formation. Downstream of the constricted region, the conduit flow path widens back to the pre-constriction cross-sectional area, the fluid velocity reduces accordingly and the fluid pressure increases again above the saturation vapour pressure. The bubbles thus collapse, or cavitate, causing turbulence in the fluid in turbulent zone 112 downstream of the constriction.

System 100 further comprises injectors 114 which are configured to inject a flowing stream of deep eutectic solvent 116 into turbulent zone 112. Deep eutectic solvent 116 may be a non-magnetic deep eutectic solvent. Aspects of the conduit portion downstream of constricted region 106, marked A in FIG. 1, can be seen in greater detail in FIG. 2. Injectors 114 comprise an injector channel 118 through which the stream of deep eutectic solvent 116 is flowed. The flowing stream passes through flow constriction 120 in injector channel 118, which may also be a Venturi narrowing or plate orifice. The Venturi pressure drop caused by flow constriction 120 causes the formation of solvent-phase bubbles 122 which cavitationally collapse downstream of flow constriction 120.

The stream of deep eutectic solvent 116, with collapsing bubbles 122, is injected into turbulent zone 112 of conduit 104. Preferably, injector 114 is configured, with respect to constricted region 106, to inject deep eutectic solvent 116 into the flow of fuel oil 102 such that the solvent-phase bubbles 122 and oil-phase bubbles 110 collapse coincidentally in turbulent zone 112. The cavitational collapse of bubbles in both streams in the same region produces extremely high-shear localised mixing conditions which extract sulfur from fuel oil 102 into association with deep eutectic solvent 116, in a volumetrically small portion of conduit 104, despite the immiscibility of the two compositions. As depicted in FIGS. 1 and 2, injectors 114 are configured to inject the stream of deep eutectic solvent at an acute angle, generally counter-current to the overall flow of fuel oil 102 in the conduit 104. The counter-current injection further enhances the turbulent mixing of the two phases, and thus the sulfur extraction, in turbulent zone 112.

Figure 2:
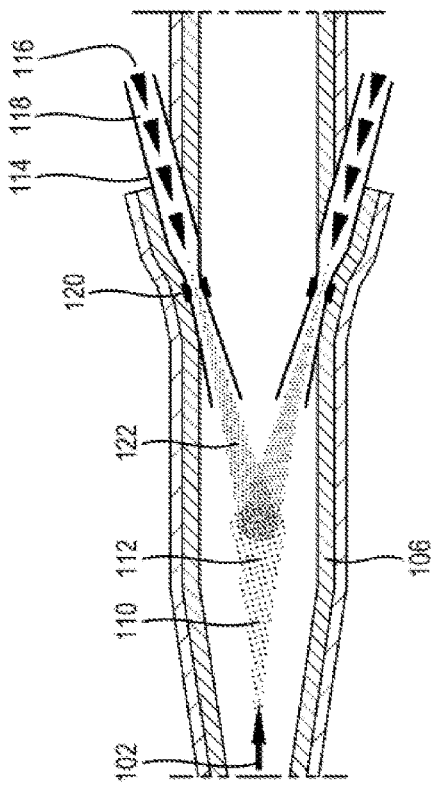
FIG. 2 schematically depicts a conduit portion downstream of the first constricted region, in the conduit of FIG. 1.

With continued reference to FIG. 1, system 100 optionally comprises one or more ultrasonic horns 124 which transmit acoustic energy into and extend the effective length of turbulent zone 112 downstream of constricted region 106. The ultrasonication provides a secondary source of energy to induce bubble formation and cavitation, which supplements the hydrodynamically induced cavitation caused by the constricted flow through constricted region 106 and flow constriction 120.

After the high-shear mixing in turbulent zone 112, the mixture of fuel oil 102 with injected deep eutectic solvent 116 continues to flow through conduit 104 and passes through a second constricted region 136. The pressure drop induces formation of new bubbles 140 in the fluid which collapse in a second turbulent region 142 downstream of constricted region 136. Injectors 144 inject further streams of deep eutectic solvent 116 into turbulent zone 142. Aspects of the conduit portion downstream of constricted region 136, marked B in FIG. 1, can be seen in greater detail in FIG. 3. Injectors 144 comprise an injector channel 148 through which the stream of deep eutectic solvent 116 is flowed. The flowing stream passes through flow constriction 150 in injector channel 148, causing the formation of solvent-phase bubbles 152 which cavitationally collapse downstream of flow constriction 150.

Figure 3:
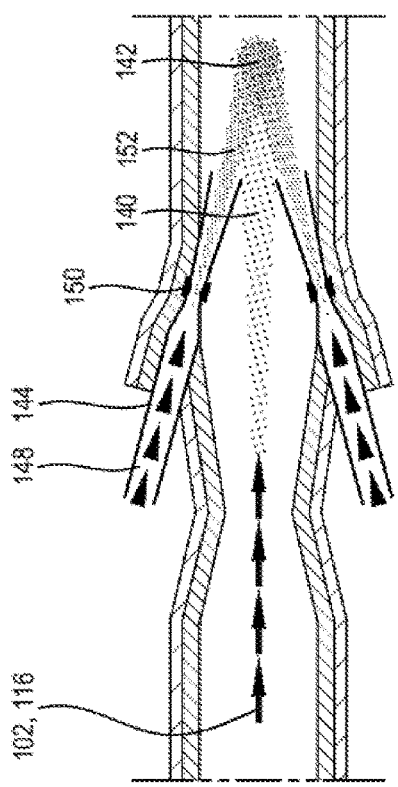
FIG. 3 schematically depicts a conduit portion downstream of the second constricted region, in the conduit of FIG. 1.

The stream of deep eutectic solvent 116, with collapsing bubbles 152, is injected into turbulent zone 142 of conduit 104, preferably such that the solvent-phase bubbles 152 and oil-phase bubbles 140 collapse coincidentally in turbulent zone 142. The cavitational collapse of bubbles in both streams in the same region produces extremely high shear localised mixing conditions which extract further amounts of sulfur from fuel oil 102 into association with the newly injected deep eutectic solvent 116. As depicted in FIGS. 1 and 3, injectors 144 are configured to inject the stream of deep eutectic solvent at an acute angle, such as about 30° C., and generally co-current to the overall flow of fuel oil 102 in the conduit 104. As seen in FIG. 1, the fluid downstream of constricted region 136 may optionally be subjected to ultrasonication via one or more ultrasonic horns 154 to induce further cavitational mixing, extend the effective length of turbulent zone 112 and thus enhance the extraction of sulfur.

After the high shear mixing in turbulent zones 112 and 142, mixture 156 of extracted fuel oil 102 with deep eutectic solvent 116 continues to flow through conduit 104 and is further processed, with the deep eutectic solvent 116 and the extracted sulfur ultimately being separated from the desulfurized fuel oil 102.

According to a related embodiment of the invention, for example for deep desulfurization of oil compositions such as jet fuel, a small amount of hydrogen peroxide 156 is injected via one or both of inlets 158, 188 positioned immediately upstream of constricted regions 106 and 136 respectively. The hydrogen peroxide contributes to the desulfurization of oil composition 102 by oxidising refractory sulfur-containing species to oxidised sulfur species which are readily extracted into the polar deep eutectic solvent 116. The oxidation reactions are enhanced by the bubble cavitation and turbulence in turbulent regions 112 and 142. This oxidative extraction mechanism supplements the primary desulfurization mechanism, i.e. cavitationally-induced extraction of non-oxidised sulfur species, to achieve a deeper desulfurization of oil composition 102 while still avoiding the use of large amounts of oxidant. In this embodiment, deep eutectic solvent 116 may be a iron-containing magnetic deep eutectic solvent as described herein. The oxidation of sulfur-containing species in the oil composition may be catalysed by iron species in the deep eutectic solvent.

According to another related embodiment of the invention, a small amount of hydrogen donor 157, for example tetralin or a suitable middle distillate, is injected via one or both of inlets 158, 188 positioned immediately upstream of constricted regions 106 and 136 respectively. Cavitation in turbulent zones 112, 142 creates extreme localised conditions of temperature and pressure adjacent the collapsing bubbles which can cleave covalent bonds in the fuel oil, including both C—C and C—S bonds, to generate radical species. The addition of hydrogen donor 157 facilitates the transfer of hydrogen atoms to these radical species, thus inhibiting radical combination reactions which form high molecular weight species. The viscosity of the desulfurized fuel oil is thus reduced, and the amount of hydrogen donor 157 added to the fuel oil 102 can be used to control the resultant viscosity to a target range. Advantageously, the fuel oil is thus synergistically desulfurized and viscosity-adjusted in a single process unit to produce a high value fuel oil product.

According to another related embodiment of the invention, deep eutectic solvent 116 is injected via one or both of inlets 158, 188 positioned immediately upstream of constricted regions 106 and 136 respectively, and not via injectors 114, 144 (which may be absent). When injected via injector 158, the two phase mixture of fuel oil 102 and deep eutectic solvent 116 flow together through constricted region 106. The pressure drop induces formation of bubbles 140 in the mixed fluids which collapse in turbulent region 112 thus inducing high-shear mixing of the two phases and extraction of sulfur from the fuel oil 102. Similarly, further deep eutectic solvent 116 injected via inlet 188 is cavitationally mixed with fuel oil 102 in turbulent region 142, thus extracting a further portion of sulfur.

According to yet another related embodiment of the invention, deep eutectic solvent 116 is injected as non-cavitating, high pressure jet streams via injectors 114 and 118. The high pressure injection into turbulent zones 112 and 142 may assist to create turbulence and extractive mass transfer.

Figure 4:
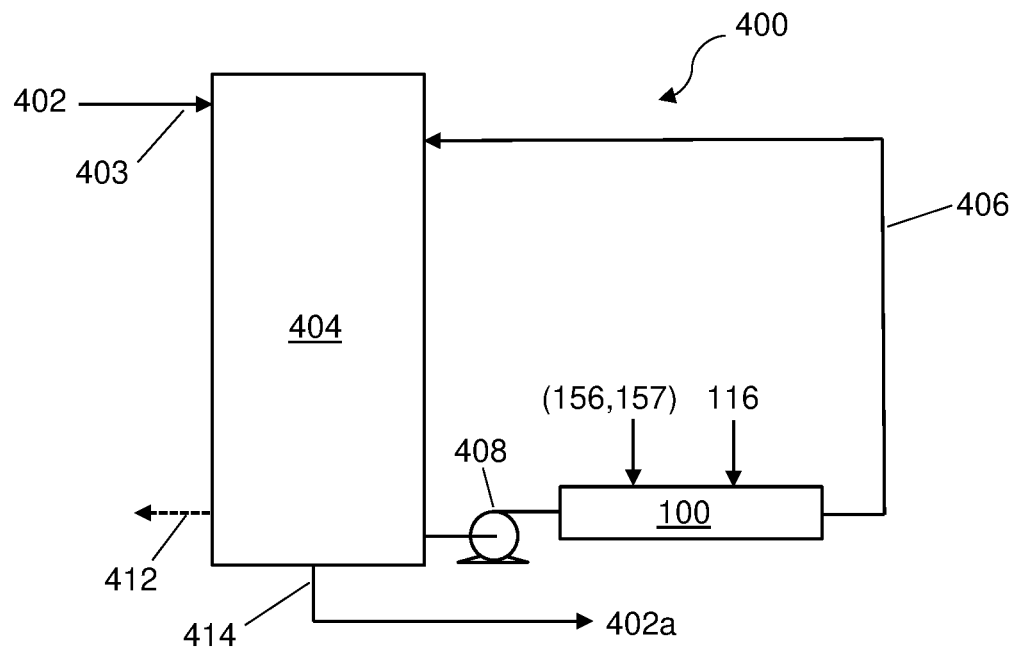
FIG. 4 schematically depicts a circulating system for desulfurizing fuel oil according to embodiments of the invention.

The methods of the invention may be implemented to desulfurize fuel oil in a number of different ways. Schematically depicted in FIG. 4 is process 400 according to an embodiment of the invention. Fuel oil 402 to be desulfurized is fed via inlet 403 to reservoir 404, which may optionally be an existing storage tank for fuel oil in a refinery or oil storage facility. A stream of fuel oil 402 is drawn from reservoir 404 and circulated through recirculation line 406 by high-shear pump 408. System 100, according to any of the embodiments disclosed above, is integrated into the recirculation line immediately downstream of the pump. Fuel oil 402 flowing through system 100 is extracted with deep eutectic solvent 116 under hydrodynamic cavitation conditions as disclosed herein. Oxidant 156 or hydrogen donor 157 may optionally be added, as required, to system 100.

The fuel oil may be circulated through system 100 as many times as required to achieve a target sulfur concentration and/or viscosity profile. Advantageously, the size of system 100 may thus be small compared to reservoir 404, and in particular the volume of oil undergoing extraction in the turbulent zone may be a low proportion, for example 1% or less, of the total inventory of fuel oil in reservoir 404. Optionally, fuel oil 402 may be sampled at sample point 412 for analysis (or monitored by an online analyser), with the results used to control recirculation through system 100 and thus the degree of desulfurization. Optionally, the geometry of the constricted region(s) in system 100, and thus the bubble size and distribution, may also be controlled in response to the changing properties of fuel oil 402 during the desulfurization. The mixture of desulfurized fuel oil 402a and deep eutectic solvent present in reservoir 404 may be agitated and/or maintained at a temperature where the densities are similar, thus preventing phase separation. The mixture is withdrawn via outlet 414 and sent for separation to remove the deep eutectic solvent, associated sulfur and other extracted species from desulfurized fuel oil 402a.

Process 400 may suitably be operated in batch mode, so that reservoir 404 is filled with fuel oil 402, desulfurized by recirculation through system 100, and then drained via outlet 414 once the required properties are obtained. Alternatively, process 400 may be operated continuously, with continuous feed of fuel oil 402 and withdrawal of fuel oil 402a, and a sufficient residence time of the fuel oil in reservoir 404 to obtain the required properties.

Figure 5:
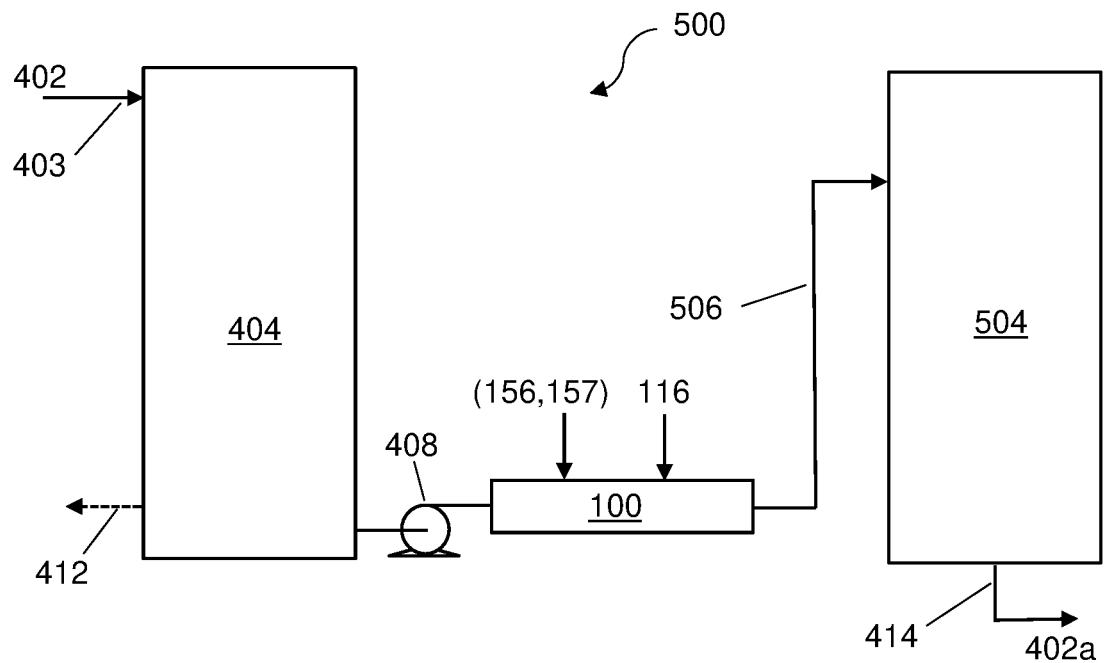
FIG. 5 schematically depicts a once-through system for desulfurizing fuel oil according to embodiments of the invention.

Schematically depicted in FIG. 5 is process 500 according to another embodiment of the invention, where similarly numbered items in process 500 are as described for process 400. In process 500, however, fuel oil 402 is transferred from reservoir 404 to reservoir 504 via system 100 located in transfer line 506. This approach may be suited to scenarios where a single pass through system 100 is sufficient to desulfurize fuel oil 402. Reservoirs 404 and 504 may thus be configured to hold untreated fuel oil, and a mixture of desulfurized fuel oil and deep eutectic solvent, respectively.

Figure 6:
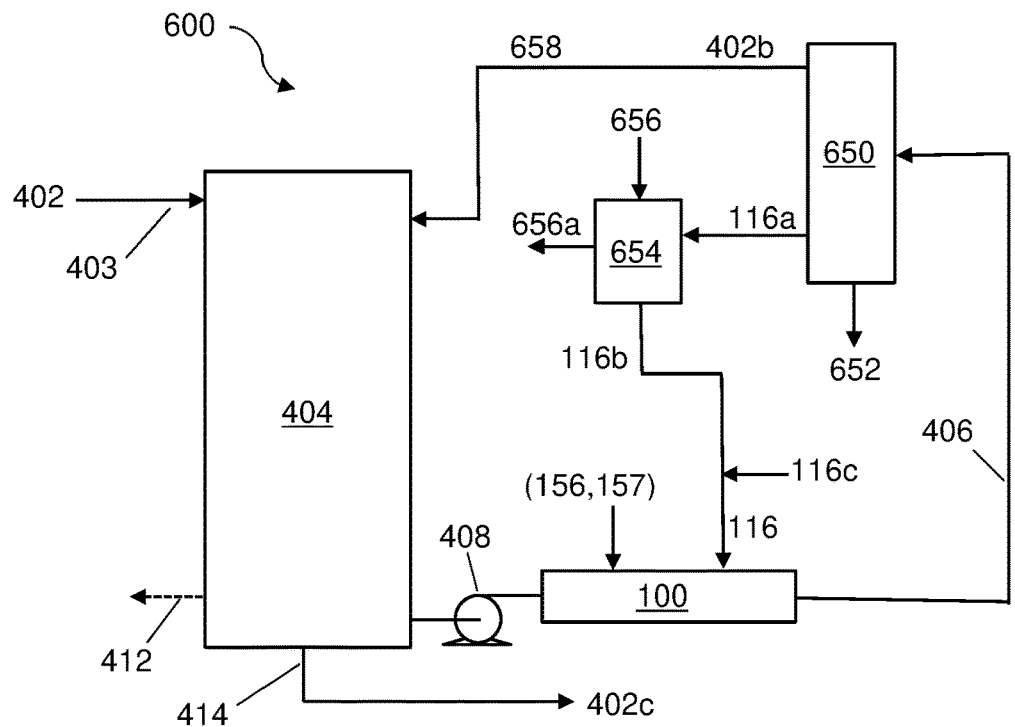
FIG. 6 schematically depicts a circulating system for desulfurizing fuel oil, including separation and deep eutectic solvent regeneration units, according to embodiments of the invention.

Schematically depicted in FIG. 6 is process 600 according to another embodiment of the invention, where similarly numbered items in process 600 are as described for process 400. In process 600, fuel oil 402 to be desulfurized is fed via inlet 403 to reservoir 404. A stream of fuel oil 402 is pumped by high-shear pump 408 through system 100, according to any of the embodiments disclosed above, where it is extracted with deep eutectic solvent 116 under hydrodynamic cavitation conditions as disclosed herein. Oxidant 156 or hydrogen donor 157 may optionally be added, as required, to system 100.

The resulting mixture of desulfurized fuel oil, extracted sulfur and deep eutectic solvent is sent from system 100 via line 406 to separation unit 650. There, the desulfurized fuel oil 402b is separated from deep eutectic solvent 116a, for example in a centrifugal separator or in a magnetically-assisted separator (in the case of a magnetic deep eutectic solvent 116). If a discrete third phase rich in extracted sulfur-containing species phase-separates in separation unit 602, this may be withdrawn as sulfur-containing composition 652.

The separated deep eutectic solvent 116a, with associated sulfur-containing species and other extracted species, is then sent to regeneration unit 654 where it is washed with a suitable wash solvent 656, e.g. dimethylformamide, in one or more wash stages to purify the deep eutectic solvent. The sulfur-bearing wash fluid 656a is sent for further processing and solvent recovery. Regenerated deep eutectic solvent 116b is then recycled back to system 100, optionally supplemented by make-up stream 116c.

The separated stream of desulfurized fuel oil 402b is recirculated from separation unit 650 to reservoir 404 via return line 658. The fuel oil may be circulated through system 100 as many times as required to achieve a target sulfur concentration and/or viscosity profile. As in process 400, system 100 may be advantageously small compared to the inventory of oil in reservoir 404, and the fuel oil may be sampled at sample point 412 for analysis to control the recirculation through system 100 and thus the degree of desulfurization. Desulfurized fuel oil 402c present in reservoir 404 may be withdrawn via outlet 414 as required, either in batch or continuous mode as described for process 400.

In some embodiments, two process units configured and operated as system 600 described above are used in series in a two-stage desulfurization process. In the first process unit (system 600A), fuel oil 402 with sulfur content of greater than 3 wt. % is desulfurized, at an extraction temperature of between 45 and 60° C. and without the addition of oxidant 156 or hydrogen donor 157, to produce intermediate desulfurized fuel oil 402c with a sulfur content in the range of 0.6 to 1 wt. %. Fuel oil 402c is then used as the feedstock 402 for the second process unit (system 600B), where it is desulfurized to further reduce the sulfur content in the final fuel oil product. In particular, in system 600B, the turbulent extraction zone is operated under inert conditions at elevated temperatures, e.g. between 100° C. and 150° C., and a middle distillate hydrogen donor 157 is injected upstream of the constricted zone at a ratio of 1:4 w/w relative to the fuel oil. Under these conditions, cracking and hydrogen transfer reactions of heavy sulfur-containing and macromolecular (e.g. asphaltene) components remaining in fuel oil 402c are induced by cavitational bubble collapse. As a result of the combined reactive and extractive mechanisms, a low viscosity and low sulfur (<0.5 wt. %) final fuel oil product is produced.

Figure 7:
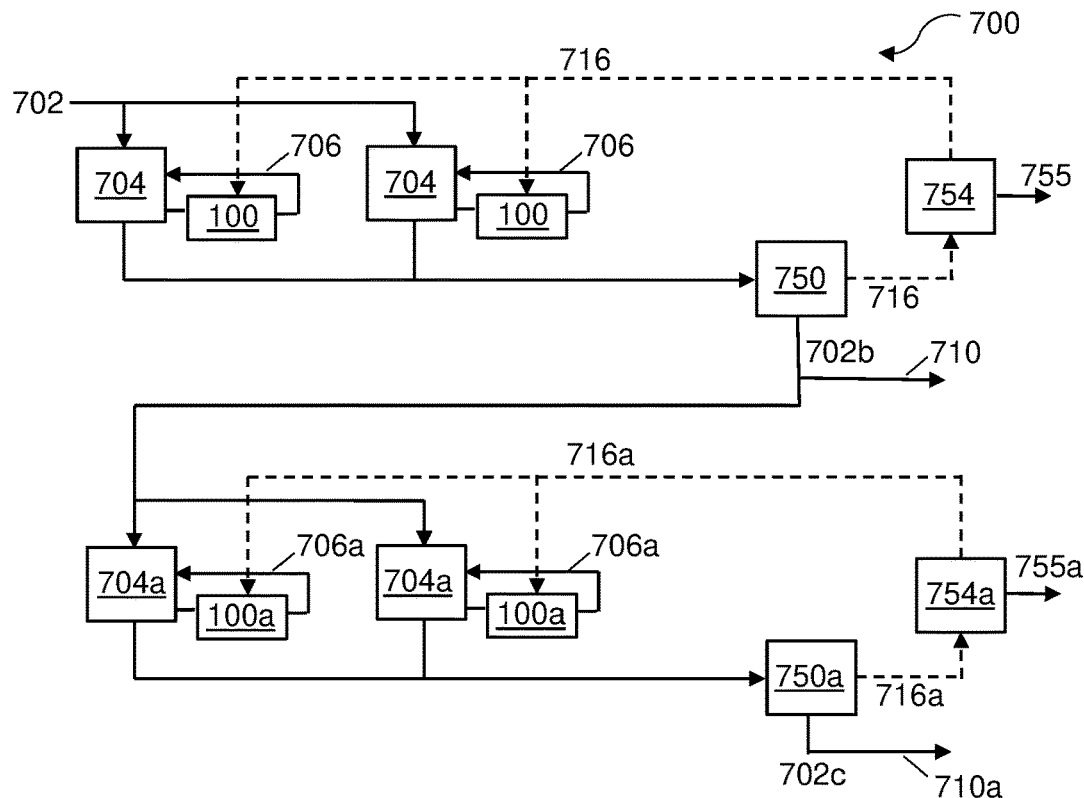
FIG. 7 schematically depicts a two-stage system for desulfurizing fuel oil according to embodiments of the invention.

Schematically depicted in FIG. 7 is a two-stage desulfurization process 700 according to another embodiment of the invention. In process 700, fuel oil 702 containing in excess of 3 wt. % sulfur is fed to a battery of two or more reservoirs 704. Each reservoir 704 is equipped with a system 100 integrated into recirculation line 706, according to any of the embodiments disclosed above, where the fuel oil is extracted with deep eutectic solvent 716 under hydrodynamic cavitation conditions as disclosed herein. Deep eutectic solvent 716 may suitably be tetrabutylammonium bromide/ethylene glycol which has favourable density properties and can extract a broad range of sulfur-containing compounds.

The resulting mixture of desulfurized fuel oil, extracted sulfur and deep eutectic solvent is sent from each reservoir 704 to separation unit 750. There, the desulfurized fuel oil 702 is separated from deep eutectic solvent 716. The separated deep eutectic solvent 716, with associated sulfur-containing species and other extracted species, is then sent to regeneration unit 754 where the deep eutectic solvent is purified and the extracted species 755 removed. Regenerated deep eutectic solvent 716 is then recycled back to systems 100.

The separated stream of desulfurized fuel oil 702b is removed from separation unit 750. As a result of the extraction, the sulfur content is reduced to 1.47 wt. % or just below. Depending on the price spread between the fuel oil and low-sulfur distillate blendstock, this degree of desulfurization may be acceptable and fuel oil 702b leaves process 700 via outlet 710.

If, however, the price spread justifies a deeper desulfurization, fuel oil 702b is sent to a secondary battery of two or more reservoirs 704a. Each reservoir 704a is equipped with a sulfur extraction system 100a integrated into recirculation line 706, according to any of the embodiments disclosed above, where fuel oil 702b is extracted with deep eutectic solvent 716a under hydrodynamic cavitation conditions as disclosed herein.

The conditions of extraction and the selection of deep eutectic solvent 716a may be different from that in the first extraction stage and in particular may be designed to target the intractable heavy sulfur-containing species and/or other undesirable species remaining in fuel oil 702b. For example, a deep eutectic solvent with good extractive capabilities for both sulfur and nitrogen-containing species, such as choline chloride/ethylene glycol, may be preferred. In another example, a deep eutectic solvent with particularly good extractive capabilities for heavy sulfur species, such as tetrabutylammonium bromide/sulfolane, may be preferred. In yet another example, a small amount of oxidant is added to the extraction zone of systems 100a as disclosed herein. In this case, a magnetic deep eutectic solvent may be used to catalyse the oxidation reactions. In yet another example, a hydrogen donor is added to the extraction zone of systems 100a to assist with desulfurization and to achieve a target viscosity reduction. It will be appreciated that other parameters, such as extraction temperature, the energy of cavitation etc may be different in the second extraction stage to achieve a high overall desulfurization.

The mixture of desulfurized fuel oil, extracted sulfur and deep eutectic solvent is sent from each reservoir 704a to separation unit 750a. The separated deep eutectic solvent 716a, with associated sulfur-containing species and other extracted species, is then sent to regeneration unit 754a where the deep eutectic solvent is purified and the extracted species 755a removed. Regenerated deep eutectic solvent 716a is then recycled back to systems 100a.

The separated stream of desulfurized fuel oil 702c is removed from separation unit 750 and leaves process 700 via outlet 710a. As a result of the two-stage extraction, the sulfur content may be reduced to 0.97-0.99 wt. % or even lower. Such desulfurized fuel oils are suitable for 1:1 blending with low sulfur distillates to produce MARPOL Annexe VI compliant maritime fuels.

EXAMPLES

The present invention is described with reference to the following examples. It is to be understood that the examples are illustrative of and not limiting to the invention described herein.

Example 1

A non-ferromagnetic deep eutectic solvent (hereafter TBAB-EG) was prepared by mixing tetra-n-butyl ammonium bromide (TBAB) and ethylene glycol (EG), for 4 hours at 55° C. The components were added in amounts of 1:4 mol/mol respectively.

A non-ferromagnetic deep eutectic solvent (hereafter TBAC-EG) was prepared by mixing tetra-n-butyl ammonium chloride (TBAC) and ethylene glycol (EG), for 4 hours at 55° C. The components were added in amounts of 1:4 mol/mol respectively.

Example 2

A mixture of TBAB-EG (as prepared in Example 1) and Intermediate Fuel Oil (IFO) was placed in an autoclave equipped with an overhead stirrer. The mixture was then stirred under high shear conditions (stirrer at 400 r.p.m.).

After the stirring period, the mixture was allowed to phase-separate and a sample of the IFO was withdrawn. The initial IFO and the desulfurized IFO were subjected to sulfur analysis according to ASTM D4294. The results are shown in Table 2.

TABLE 2

| TBAB:EG to IFO ratio (w/w) | Temperature during stirring (° C.) | Time of stirring (hours) | Starting IFO sulfur content (wt. %) | Desulfurized IFO sulfur content (wt. %) |
| --- | --- | --- | --- | --- |
| 1:1 | 60 | 2 | 2.84 | 1.18 |
| 1:1 | 45 | 2 | 2.84 | 0.90 |
| 0.6:1 | 50 | 0.5 | 2.84 | 1.61 |

Example 3

A mixture of TBAB-EG (as prepared in Example 1) and Intermediate Fuel Oil (IFO) was placed in an autoclave equipped with an overhead stirrer. The mixture was then stirred under high shear conditions (stirrer at 400 r.p.m.) at 48° C. for two hours in a first extraction stage. After the stirring period, the mixture was centrifuged to phase-separate and a sample of the IFO was withdrawn. The initial IFO and the desulfurized IFO were subjected to sulfur analysis according to ASTM D4294. The results are shown in Table 3 (Stage 1).

The resulting separated desulfurized IFO was again placed in the autoclave together with TBAC-EG (as prepared in Example 1). The mixture was then stirred under high shear conditions (stirrer at 400 r.p.m.) at 51° C. for two hours in a second extraction stage. After the stirring period, the mixture was centrifuged to phase-separate and a sample of the IFO was withdrawn. The results are shown in Table 3 (Stage 2). The two stage extraction process was able to reduce the level of sulfur in the IFO to extremely low levels.

TABLE 3

| Stage | Deep eutectic solvent | TBAC:EG to IFO ratio (w/w) | Temperature during stirring (° C.) | Time of stirring (hours) | Starting IFO sulfur content (wt. %) | Desulfurized IFO sulfur content (wt. %) |
|---|---|---|---|---|---|---|
| 1 | TBAB:EG | 1:1 | 48 | 2 | 2.47 | 0.24 |
| 2 | TBAC:EG | 1:1 | 51 | 2 | 0.24 | 0.12 |

Those skilled in the art will appreciate that the invention described herein is susceptible to variations and modifications other than those specifically described. It is understood that the invention includes all such variations and modifications which fall within the spirit and scope of the present invention.

The invention claimed is:

1. A method of desulfurizing an oil composition, the method comprising:
    flowing an oil composition comprising sulfur through a conduit comprising a constricted region, wherein oil-phase bubbles form in the constricted region and collapse by hydrodynamic cavitation in a turbulent zone downstream of the constricted region;
    contacting the oil composition with an immiscible deep eutectic solvent in the turbulent zone, thereby extracting at least a portion of the sulfur from the oil composition into association with the deep eutectic solvent; and
    separating the deep eutectic solvent and the extracted sulfur from the desulfurized oil composition.

2. The method according to claim 1, wherein contacting the oil composition with the deep eutectic solvent comprises introducing one or more streams of the deep eutectic solvent into the oil composition downstream of the constricted region.

3. The method according to claim 2, wherein a flow of the deep eutectic solvent is directed through a flow constriction to produce solvent-phase bubbles in the one or more streams of the deep eutectic solvent introduced into the oil composition, and wherein the solvent-phase bubbles and the oil-phase bubbles collapse coincidentally in the turbulent zone to enhance extraction of the sulfur from the oil composition.

4. The method according to claim 1, wherein the deep eutectic solvent comprises a eutectic mixture of a quaternary ammonium salt and a hydrogen bond donor.

5. The method according to claim 4, wherein the hydrogen bond donor is a glycol.

6. The method according to claim 1, further comprising contacting the oil composition with a hydrogen donor in the turbulent zone, wherein the hydrogen donor reduces the viscosity of the desulfurized oil composition.

7. The method according to claim 6, wherein the hydrogen donor is a hydrocarbon hydrogen donor solvent.

8. The method according to claim 1, further comprising contacting the oil composition with an oxidant in the turbulent zone, wherein the oxidant is added in a molar ratio of less than 0:5:1 relative to sulfur in the oil composition and wherein the oxidant oxidises sulfur-containing molecules in the oil composition to produce oxidised sulfur species and the oxidised sulfur species are at least partially extracted into the deep eutectic solvent.

9. The method according to claim 1, wherein the deep eutectic solvent is a magnetic deep eutectic solvent.

10. The method according to claim 1, wherein the temperature is in the range of 45 to 60° C. when contacting the oil composition with the deep eutectic solvent in the turbulent zone.

11. The method according to claim 1, wherein the deep eutectic solvent has a temperature dependent density, wherein the deep eutectic solvent has (i) a density which differs from the density of the desulfurized oil composition by less than 0.08 g/cm3 when contacting the oil composition with the deep eutectic solvent in the turbulent zone, and (ii) a density which differs from the density of the desulfurized oil composition by more than 0.08 g/cm3 when separating the deep eutectic solvent and the extracted sulfur from the desulfurized oil composition.

12. The method according to claim 1, wherein flowing the oil composition through the conduit comprises circulating an inventory of the oil composition repeatedly through the conduit.

13. The method according to claim 1, wherein the oil composition is a fuel oil and wherein the desulfurized oil composition has a sulfur content of no more than 1.97 wt. %.

14. A two-stage process for desulfurizing an oil composition, comprising:
    in a first stage, desulfurizing an oil composition by a method according to claim 1 to produce a first desulfurized oil composition; and
    in a second stage, desulfurizing the first desulfurized oil composition by a method according to claim 1 to produce a second desulfurized oil composition.

15. A system for desulfurizing an oil composition, the system comprising:
    a conduit comprising a constricted region;
    a pump for flowing an oil composition comprising sulfur through the conduit; and
    one or more injection ports for introducing a stream of deep eutectic solvent to the conduit;
    wherein the system is operable to:
        (i) flow the oil composition through the conduit such that oil-phase bubbles form in the constricted region and collapse by hydrodynamic cavitation in a turbulent zone downstream of the constricted region; and
        (ii) contact the oil composition with the deep eutectic solvent in the turbulent zone, thereby extracting at least a portion of the sulfur from the oil composition into association with the deep eutectic solvent.

16. The system according to claim 15, wherein the injection ports introduce the stream of deep eutectic solvent to the conduit downstream of the constricted region by injection directly into the turbulent zone.

17. The system according to claim 16, wherein at least one of the injection ports comprises a flow constriction configured to produce solvent-phase bubbles in the stream of deep eutectic solvent introduced into the conduit.

18. The system according to claim 15, further comprising a separator for separating the deep eutectic solvent and the extracted sulfur from the desulfurized oil composition.

19. The system according to claim 18, wherein the separator is selected from a magnetic separator and a triphase liquid-liquid separator for separating a phase rich in desulfurized oil composition, a phase rich in deep eutectic solvent, and a phase rich in sulfur-containing compounds.

20. The system according to claim 15, further comprising a reservoir for holding an inventory of the oil composition to be flowed, by the pump, through the conduit, wherein the system is configured to circulate the inventory of the oil composition repeatedly through the conduit.

\* \* \* \* \*